US009852232B2

(12) United States Patent
Anderson et al.

(10) Patent No.: US 9,852,232 B2
(45) Date of Patent: Dec. 26, 2017

(54) AUTOMATING EVENT TREES USING ANALYTICS

(71) Applicant: International Business Machines Corporation, Armonk, NY (US)

(72) Inventors: Eric M. Anderson, Friendswood, TX (US); Christopher J. Dawson, Arlington, VA (US); Rajesh Radhakrishnan, Reston, VA (US)

(73) Assignee: International Business Machines Corporation, Armonk, NY (US)

( * ) Notice: Subject to any disclaimer, the term of this patent is extended or adjusted under 35 U.S.C. 154(b) by 615 days.

(21) Appl. No.: 14/074,771

(22) Filed: Nov. 8, 2013

(65) Prior Publication Data

US 2015/0134601 A1    May 14, 2015

(51) Int. Cl.
*G06F 17/30*    (2006.01)

(52) U.S. Cl.
CPC .... *G06F 17/30961* (2013.01); *G06F 17/3053* (2013.01)

(58) Field of Classification Search
CPC ................................. G06F 17/30961
See application file for complete search history.

(56) References Cited

U.S. PATENT DOCUMENTS

| | | | | |
|---|---|---|---|---|
| 5,799,294 | A * | 8/1998 | Tanaka | G05B 23/0278 706/45 |
| 6,609,205 | B1 * | 8/2003 | Bernhard | H04L 12/2602 726/22 |
| 7,681,086 | B2 | 3/2010 | Vlassova et al. | |
| 8,261,132 | B2 | 9/2012 | Klein et al. | |
| 8,346,694 | B2 | 1/2013 | Dugan et al. | |
| 2002/0052950 | A1 | 5/2002 | Pillai et al. | |
| 2005/0086538 | A1 * | 4/2005 | Kubota | G06F 21/552 726/4 |
| 2005/0147211 | A1 * | 7/2005 | Veeraraghavan | H04M 3/28 379/27.01 |
| 2010/0179997 | A1 | 7/2010 | Pulla et al. | |
| 2010/0235368 | A1 * | 9/2010 | Bhattacharya | G06F 17/227 707/755 |
| 2010/0257412 | A1 * | 10/2010 | Acuna | G06F 11/0727 714/54 |
| 2011/0078206 | A1 * | 3/2011 | Chen | G06F 17/30722 707/797 |
| 2012/0215912 | A1 | 8/2012 | Houlihan et al. | |

(Continued)

OTHER PUBLICATIONS

Brocade, "Brocade Data Center Fabric Manager: Unified Fabric Management in the Evolving Data Center", © 2009 Brocade Communications Systems, Inc., 09/09/GA-TB-106-02, pp. 1-50.

(Continued)

*Primary Examiner* — Kris Mackes
(74) *Attorney, Agent, or Firm* — Maeve M. Carpenter

(57) ABSTRACT

A method is disclosed for generating event trees. The method includes receiving one or more events occurring within a networked computing environment. The method includes generating an event tree including the received one or more events. The method includes comparing the generated event tree with a plurality of event trees stored in a database. The method then includes assigning, based, at least in part, on the comparing, a probability to the generated event tree.

18 Claims, 4 Drawing Sheets

(56) References Cited

U.S. PATENT DOCUMENTS

| | | | |
|---|---|---|---|
| 2012/0331487 A1* | 12/2012 | Mikami | G06F 17/30961 |
| | | | 719/318 |
| 2013/0046884 A1 | 2/2013 | Frost et al. | |
| 2013/0262033 A1* | 10/2013 | Henson | G06Q 30/01 |
| | | | 702/183 |
| 2014/0062712 A1* | 3/2014 | Reiter | G08B 5/22 |
| | | | 340/691.6 |
| 2015/0106122 A1* | 4/2015 | Lee | G06F 19/322 |
| | | | 705/3 |
| 2015/0120640 A1 | 4/2015 | Machida | |

OTHER PUBLICATIONS

Brocade; "Brocade Network Advisor Features Brief for Data Center Networks", © 2010 Brocade Communication Systems Inc., 11/10/GA-FB-319-01, pp. 1-73.

Tsai et al., "Automated Event Tree Analysis Based-on Scenario Specifications", Fast Abstract ISSRE 2003, Copyright 2003 Chillarege Press, 2 pages.

\* cited by examiner

AUTOMATING EVENT TREES USING ANALYTICS

FIELD OF THE INVENTION

The present invention relates generally to the field of service and systems management, and more particularly to automating event trees using analytics.

BACKGROUND OF THE INVENTION

Everyday there are thousands of events, such as computer system errors or software failures, which can take place within a data center or cloud data center. A data center is a facility used to hold a network of computer systems and associated components, such as telecommunications and storage systems. In order to evaluate these thousands of events, event trees and fault trees are created to examine a chronological series of subsequent events or consequences. Event trees and fault trees are generated by creating a logical construct that attempts to represent system operational and fault states with nodes and paths that in some sense resemble the root, trunk, branches and leaves of a tree. The paths to the nodes are typically defined using Boolean logic which precisely describes logical combinations of nodes and paths.

Events can be, for example, a slow Virtual Private Network ("VPN") performance; this will cause the generation of an event tree to determine how to fix this issue. Event trees represent a complex super system of events, and fault trees represent sub-systems of events used to evaluate object efficiency and safety. Event trees are generated based upon events that occur in a system, a technology domain, or events from across technology domains. An event tree displays sequence progression, sequence end states, and sequence-specific dependencies across time. These event trees, however, are often generated long after the events have occurred and, as a result, the generated event trees are often inaccurate or irrelevant.

SUMMARY

Embodiments of the present invention disclose a method, computer program product, and computer system for generating event trees. In an embodiment, a computer processor receives one or more events occurring within a networked computing environment. The computer processor generates an event tree including the received one or more events. The computer processor compares the generated event tree with a plurality of event trees stored in a database. The computer processor then assigns, based, at least in part, on the comparing, a probability to the generated event tree.

DETAILED DESCRIPTION

Figure 1:
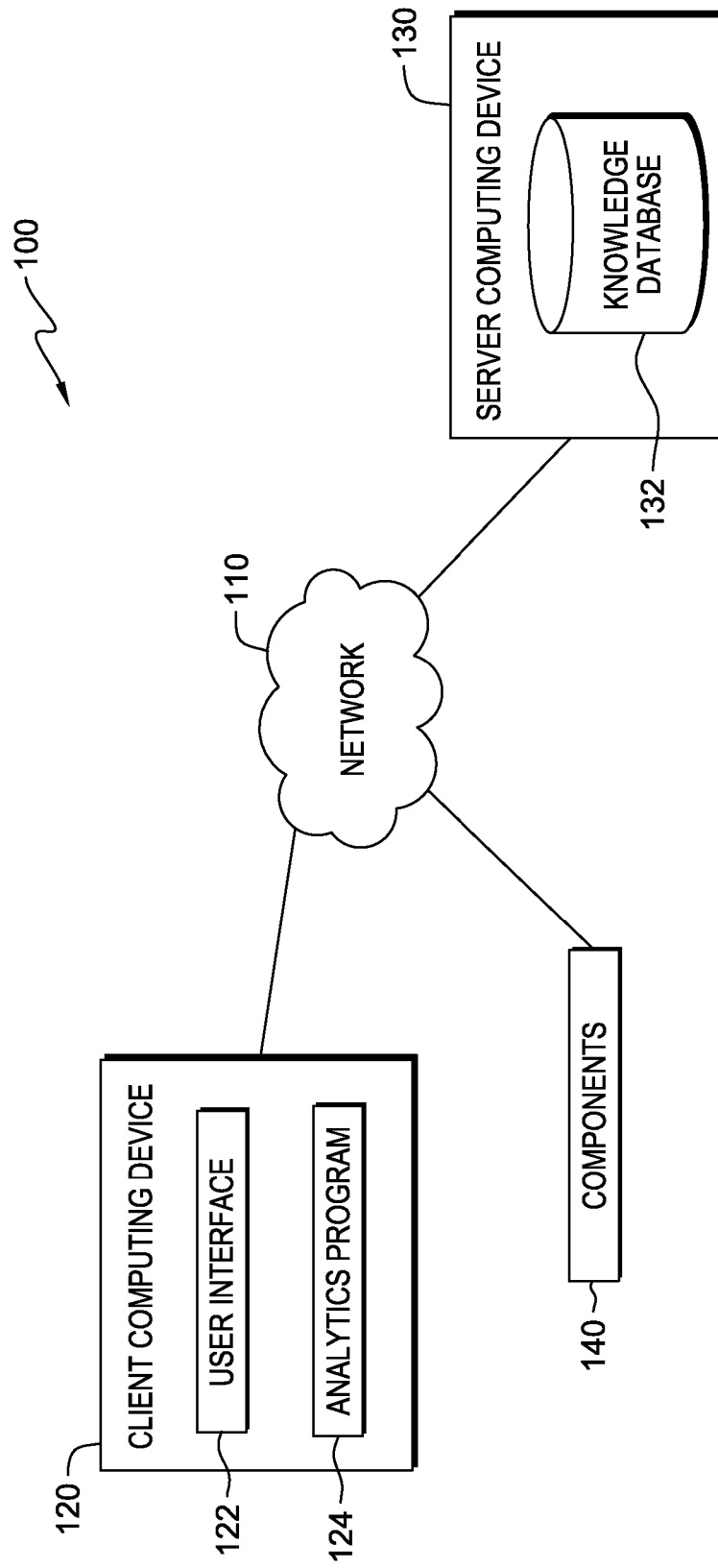
FIG. 1 is a functional block diagram illustrating a distributed data processing environment, including a client computing device and a server computing device, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Embodiments of the present invention recognize event trees are often created manually, or through automation, inaccurately and not within a time to allow them to be useful. Embodiments of the present invention recognize that generating event trees more accurately and within a reduced period of time will allow them to be more useful to a user. Event trees are generated by analyzing large sets of events and comparing the generated event trees to event trees within a database. Comparing the event trees helps provide a common understanding of the events occurring within a networked computing environment, allowing a user to determine root events, or issues, within the environment, and allowing for the prevention of the same issue recurring.

The present invention will now be described in detail with reference to the Figures. FIG. 1 is a functional block diagram illustrating a distributed data processing environment, generally designated 100, in accordance with an embodiment of the present invention.

Distributed data processing environment 100 includes client computing device 120, server computing device 130, and components 140 all interconnected over network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between client computing device 120 and server computing device 130.

In various embodiments of the present invention, client computing device 120 can be a laptop computer, a tablet computer, a netbook computer, a personal computer (PC), a desktop computer, a personal digital assistant (PDA), a smart phone, or any programmable electronic device capable of communicating with server computing device 130 via network 110. Client computing device 120 may include internal and external hardware components, as depicted and described in further detail with respect to FIG. 4. In this exemplary embodiment, client computing device 120 includes user interface (UI) 122 and analytics program 124. UI 122 may be, for example, a graphical user interface (GUI) or a web user interface (WUI) and can display text, documents, web browser windows, user options, instructions for operation, and other instruments containing text or graphical elements.

Analytics program 124 analyzes a group of events that occur within a networked computing environment, for example, a data center, such as distributed data processing environment 100, and generates a real time event tree. The events occurring with distributed data processing environment 100 may be from: within a system, within a technology domain, or from multiple technology domains. In an exemplary embodiment of the present invention, real time event trees may be determined using a combination of analytics, such as time stamps of when events occurred and known relationships between events, and real time events can be collected from multiple devices and components, represented by components 140 in FIG. 1, within the environment. The real time events are compared with event trees stored in a knowledge database, such as knowledge database 132 on server computing device 130, containing event trees published or released by vendors and downloaded from the vendors or from technical support teams, previous event trees developed for devices and components within the environment, and a root cause analysis ("RCA") database. An RCA database contains root causes of events that may help analytics program 124 compare event trees, for example, if a certain issue is known to have a specific root event, a generated real time event tree can be compared to event trees within an RCA database and, if a matching root event is found, the root event can allow the issue to be solved quicker. While in FIG. 1, analytics program 124 is included in client computing device 120, one of skill in the art will appreciate that in other embodiments, analytics program 124 may be located elsewhere within distributed data processing environment 100 and can communicate with client computing device 120 via network 110.

Server computing device 130 may include data storage or function as part of the World Wide Web (WWW) and can include spreadsheets, web browser pages or other documents that can be searched for and downloaded to client computing device 120 for viewing by a user. Server computing device 130 can be a laptop computer, a tablet computer, a netbook computer, a personal computer (PC), a desktop computer, a personal digital assistant (PDA), a smart phone, or any programmable electronic device capable of communicating with client computing device 120 via network 110 and with various other components and devices (not shown) within distributed data processing environment 100. Server computing device 130 may represent a computing system utilizing clustered computers and components to act as a single pool of seamless resources when accessed through a network. This is a common implementation for data centers and for cloud computing applications. Server computing device 130 contains knowledge database 132. Knowledge database 132 can contain a large set of event trees organized by system, device, by technology domain, and across technology domains. This set of event trees may be published by vendors, created by technical support teams, and may include an RCA database. The event trees stored within knowledge database 132 may also include previous event trees determined for devices and components within distributed data processing environment 100. While in FIG. 1, knowledge database 132 is included in server computing device 130, one of skill in the art will appreciate that in other embodiments, knowledge database 132 may be located elsewhere within distributed data processing environment 100 and can communicate with client computing device 120 and server computing device 130 via network 110.

Knowledge database 132 may also contain known relationships between devices, components, and applications within distributed data processing environment 100, for example, from a configuration management database ("CMDB"). A CMDB is a database that stores configuration items ("CI") and descriptive relationships between the CIs. A CMDB contains information about how critical information technology assets are composed within a networked computing environment, including what upstream sources or dependencies may be for each asset or component, and what downstream targets are for the assets and components. Analytics program 124 can use information in a CMDB to narrow down the number of stored event trees that may show a root cause. For example, if within a networked computing environment there are two separate events occurring, such as a slow VPN performance, and a network device disconnecting, a CMDB CI can recognize that the two events may be related.

Analytics program 124 searches knowledge database 132 for event trees that contain matching event codes, descriptions, and types, and matches those event trees to the generated real time event trees, which allows analytics program 124 to assign probabilities by comparing the real time event trees with those stored within knowledge database 132. Real time event trees are the most current event trees generated by analytics program 124. Analytics program 124 can determine matching events and events trees using a matching algorithm.

Analytics program 124 assigns a probability to the generated real time event tree based on an established set of circumstances, such as if a generated event tree has identical matching top events, root events, and/or middle events with an event tree from knowledge database 132. Analytics program 124 can also assign probabilities based on the event time stamps. For example, an event may be given a higher probability if it has occurred more recently as opposed to an event that may have occurred weeks before. Analytics program 124 can determine whether a real time event tree is similar to a stored event tree, or contains known relationships, and as a result, there may be a known solution to one or more events in the real time event tree, or a root cause may be found based on known relationships between events occurring in multiple devices. For example, one or more real time events may involve a failed connection to a network card, and stored known relationships, such as in a CMDB, may indicate what the network card is connected to, which may aid in diagnosing the root cause of the failed connection events. As another example, one or more real time events may be matched to an event in an event tree received from a vendor. The stored event tree may contain one root cause, which the one or more real time events may also be caused by. The generated event tree will be assigned a high probability because a matching event tree was found in knowledge database 132, and therefore a root cause or a solution to the real time event may be known.

If an event tree is assigned a high probability, a relevant incident ticket will be updated with that event tree, then that ticket will be provided to a user, for example on a client computing device user interface, such as UI 122 on client computing device 120. A relevant incident ticket is typically created by an issue tracking system and can contain information about technical support actions performed by technical support staff. The event tree on the relevant incident ticket provides a user with information on a possible solution to the error, failure, or other real time event occurring within distributed data processing environment 100, or provides the user with what may be the root cause of the error, failure, or other real time event.

Components 140 can be computing devices, servers, or any device capable of communication with client computing device 120 and server computing device 130. Components 140 may provide events to analytics program 124, for example, events that are occurring within distributed data processing environment 100. Events can be, for example, slow application response, errors detected on a network, or slow VPN performance.

Figure 2:
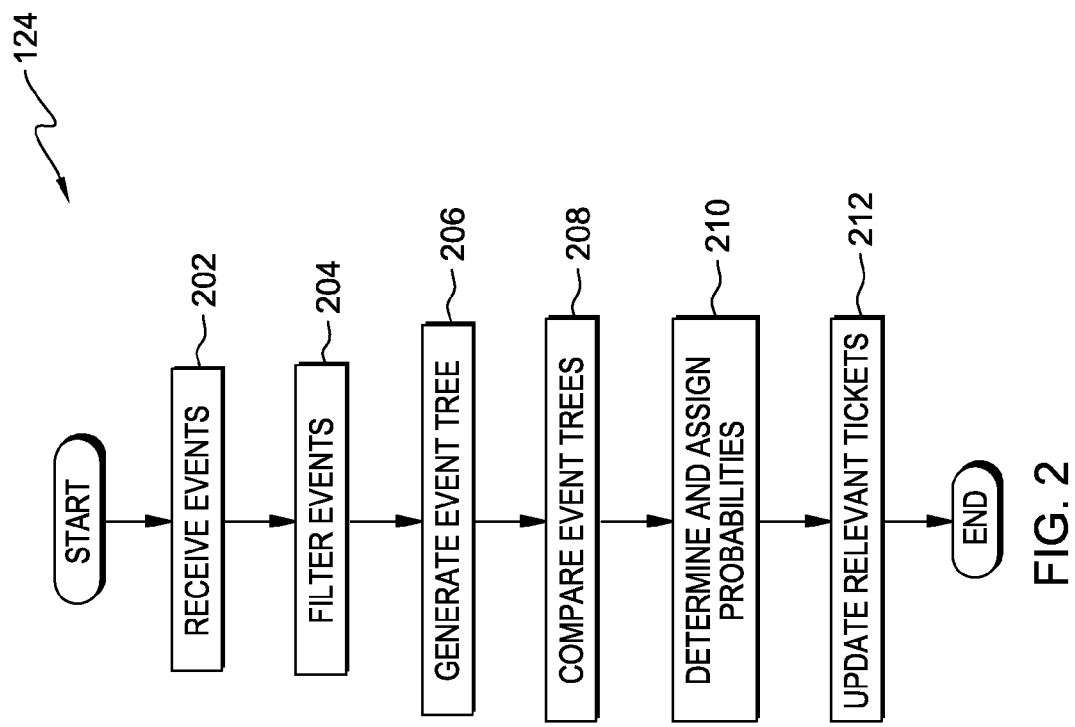
FIG. 2 is a flowchart depicting operational steps of an analytics program for analyzing events within a networked computing environment and assigning probabilities to generated event trees, in accordance with an embodiment of the present invention.

FIG. 2 is a flowchart depicting operational steps of analytics program 124 for analyzing events within a data center and assigning probabilities to generated event trees, in accordance with an embodiment of the present invention.

Analytics program 124 receives real time events (step 202). At any given time, there may be thousands of events, both normal and abnormal, occurring within a networked computing environment, such as distributed data processing environment 100 described in FIG. 1. Analytics program 124 receives and collects real time events from multiple devices and components, represented by components 140 in FIG. 1, within distributed data processing environment 100. For example, events such as a slow application response, a slow VPN performance, an error detected by network OS, a failing network card, an error detected in VPN logs, an error condition corrected with ECC in network OS, and an error corrected with ECC.

Analytics program 124 filters the real time events (step 204). Analytics program 124 gathers the thousands of real time events and searches for duplicate events, superficial events, false positive and false negative events and then removes these events from consideration.

Analytics program 124 generates a real time event tree (step 206). The generated real time event trees are categorized by using event impact analysis to determine whether the events are possible, plausible, or probable to occur with respect to each other. This will help to determine the events that may be relevant to a current issue. In another embodiment, analytics program 124 analyzes each of the filtered events using business impact analysis, service impact analysis, and CI impact analysis to determine what real time events are relevant to a current issue. In yet another embodiment, analytics program 124 escalates events that are critical to solving a current issue. Analytics program 124 uses the filtered events and determines whether an event needs to be escalated, for example, based on the most recent time stamp and the CI impact analysis. If an event is to be escalated, it may receive a level or status, for example, either a Severity 1, a Severity 2, or a Severity 3 incident status.

Analytics program 124 compares event trees (step 208). Real time event trees that have been generated by analytics program 124 will be compared to event trees stored within knowledge database 132. For example, if the root event of a generated real time event tree is Failing Network Card (HW), analytics program 124 will search knowledge database 132 for all event trees that have that identical root event. Comparing the most recently generated event trees with event trees stored in knowledge database 132 may allow a user to solve an issue based on issues that have previously occurred, or that are known as part of the stored event tree.

Analytics program 124 determines and assigns probabilities to the generated event trees (step 210). Probabilities may be determined and assigned to generated real time event trees based on a relationship of the events in the generated real time event tree to each other, and to other events occurring in the networked computing environment, or, for example, the closeness of the real time events to known CI relationships; an order of the events' occurrence, for example, organized using a time of the event; and by searching for and matching top events to stored event trees within knowledge database 132. In an exemplary embodiment of the present invention, probabilities may be determined and assigned based on the closeness of the real time events to known CI relationships reflected in service models and CMDB CI relationships. Probabilities may also be assigned by using analytics program 124 to search for top events within knowledge database 132, match the events to the most recently generated event tree, and compare those events to the most recently generated event tree. Probabilities can be determined and assigned to generated event trees in order to determine a likelihood of the generated event tree occurring within the networked computing environment, such as distributed data processing environment 100. The matching of event trees will be discussed further with respect to FIG. 3. In an alternate embodiment of the present invention, probabilities may also be assigned according to event trees with the most recent time stamp, an event tree that has a very recent time stamp may be more important that an event tree with a later time stamp and will then receive a higher probability.

Analytics program 124 updates relevant tickets (step 212). The tickets include incident tickets, reports, or event notifications, and will be updated with high probability or highly likely generated event trees. Analytics program 124 updates relevant incident tickets, or incident tickets corresponding to the generated event tree. The tickets will be available for users and displayed on UI 122. Updating relevant tickets can present to a user highly likely possible causes and outcomes of the occurring real time events, based on matching a real time event tree with a stored event tree or determining relationships between real time events, which may allow the user to resolve an issue early on in the event resolution process.

Figure 3:
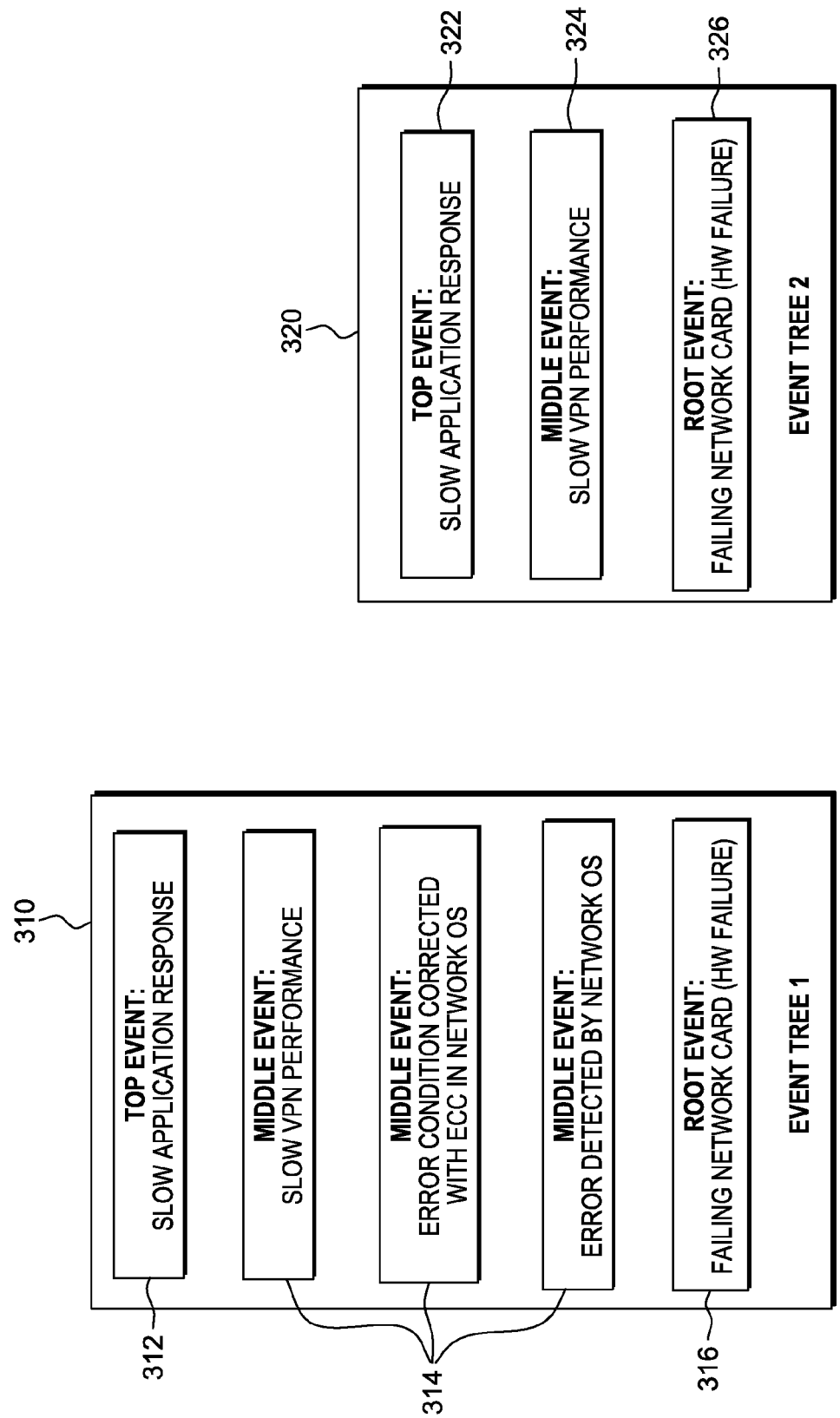
FIG. 3 illustrates an exemplary user interface, such as the user interface on the client computing device of FIG. 1, displaying results provided by the analytics program of FIG. 2, in accordance with an embodiment of the present invention.

FIG. 3 illustrates an exemplary user interface, such as UI 122 on client computing device 120, displaying results provided by analytics program 124, in accordance with an embodiment of the present invention.

Event tree 310 is a real time event tree generated by analytics program 124. Event tree 320 is an event tree stored in knowledge database 132. Analytics program 124 will match and compare a generated event tree with an event tree from knowledge database 132. If a generated event tree has identical matching top events, root events, and middle events with an event tree from knowledge database 132, that event tree may receive the highest probability rating being assigned by analytics program 124. The next highest probability rating may be if the generated event tree had matching root and middle events but not top events, followed by a generated event tree with matching root events to an event tree from knowledge database 132, and the last highest probability may come from a generated event tree having matching top events with an event tree from knowledge database 132. For example, event tree 310 may have top event 312, slow application response, middle events 314, including slow VPN performance, error condition corrected with ECC in network OS, and error detected by network OS, and root event 316, failing network card (HW failure). Analytics program 124 may match event tree 310 with event tree 320 which has top event 322, slow application response, middle event 324, slow VPN performance, and root event 326, failing network card (HW failure). Generated event tree 310 may receive a relatively high probability rating because all of the events match except for two of the middle events. A high probability rating can tell a user which event trees are more likely to help reach a decision on what the issue is that is being experienced.

Figure 4:
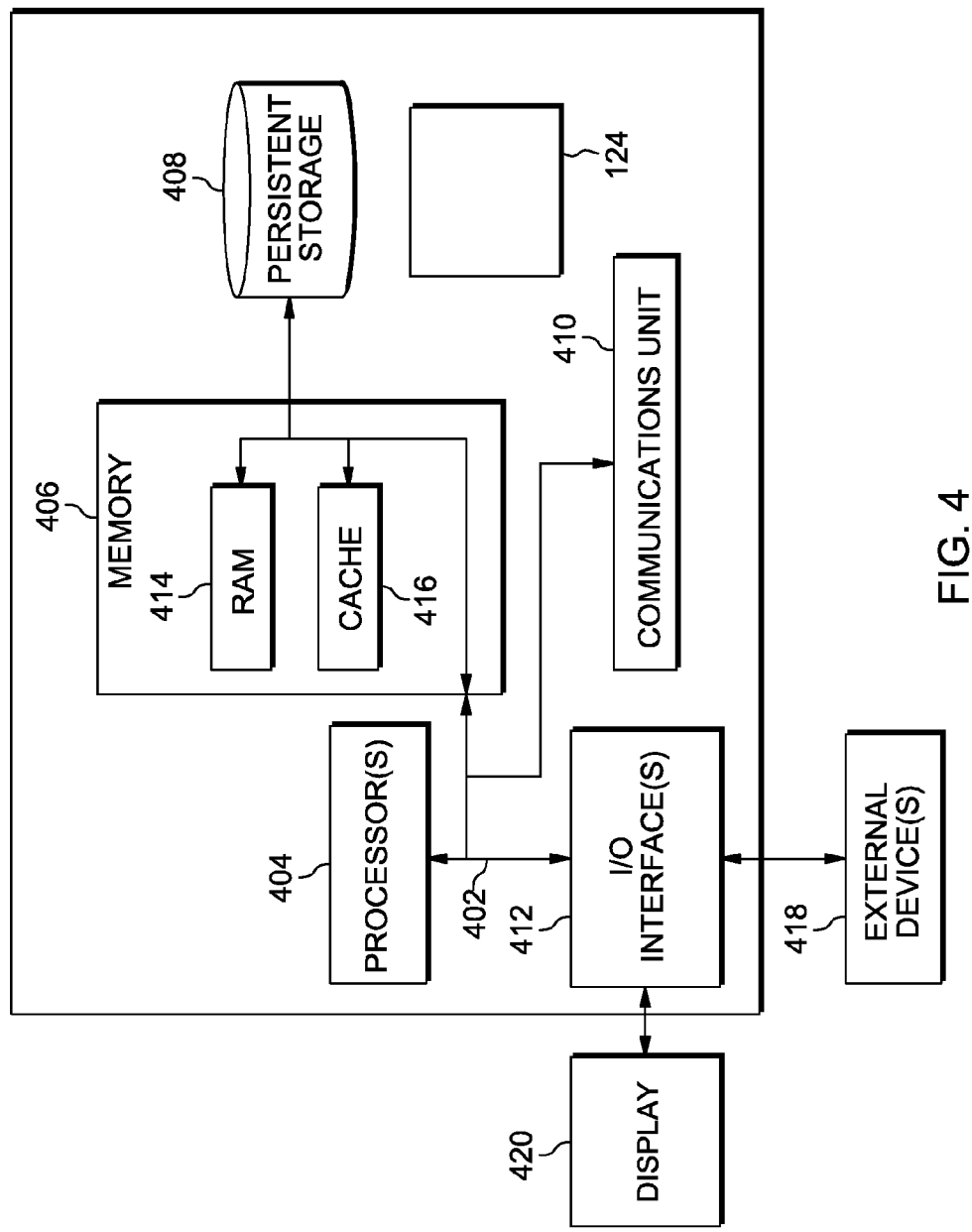
FIG. 4 depicts a block diagram of components of the client computing device of FIG. 1, in accordance with an embodiment of the present invention.

FIG. 4 depicts a block diagram of components of client computing device 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made by one of ordinary skill in the art without departing from the scope of the invention as claimed below.

Client computing device 120 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Analytics program 124 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including between client computing device 120 and server computing device 130 and with other devices and components (not shown) within distributed data processing environment 100. In these examples, communications unit 410 includes one or more network interface cards. Communications unit 410 may provide communications through the use of either or both physical and wireless communications links. Analytics program 124 may be downloaded to persistent storage 408 through communications unit 410.

I/O interface(s) 412 allows for input and output of data with other devices that may be connected to client computing device 120. For example, I/O interface 412 may provide a connection to external device(s) 418 such as a keyboard, keypad, a touch screen, and/or some other suitable input device. External device(s) 418 can also include portable computer-readable storage media such as, for example, thumb drives, portable optical or magnetic disks, and memory cards. Software and data used to practice embodiments of the present invention, e.g., analytics program 124, can be stored on such portable computer-readable storage media and can be loaded onto persistent storage 408 via I/O interface(s) 412. I/O interface(s) 412 also connect to a display 420. Display 420 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for generating event trees, the method comprising:
   receiving, by one or more computer processors, one or more events occurring within a networked computing environment;
   generating, by the one or more computer processors, an event tree including the received one or more events;
   comparing, by the one or more computer processors, the generated event tree with a plurality of event trees stored in a database, wherein comparing the generated event tree with the plurality of event trees stored in a database includes determining, by the one or more computer processors, the generated event tree includes a top event, a middle event, and a root event;
   comparing, by the one or more computer processors, the top event, the middle event, and the root event of the generated event tree with the plurality of event trees stored in the database, the plurality of event trees each including at least a top event, a middle event, and a root event;
   assigning, by the one or more computer processors, based, at least in part, on the comparing, a probability to the generated event tree, wherein the probability indicates a likelihood of the generated event tree occurring within the networked computing environment and wherein if the top event, the middle event, and the root event of the generated event tree matches the top event, the middle event, and the root event of at least one of the plurality of event trees, the assigned probability is a highest probability; and
   determining, by the one or more computer processors, based, at least in part, on the assigned probability, an incident ticket within the networked computing environment corresponding to the generated event tree, wherein the incident ticket contains information about at least one technical support action.

2. The method of claim 1, wherein the received one or more events are received from one or more technology domains.

3. The method of claim 1, wherein the plurality of event trees stored in the database include: vendor published event trees, technical support team created event trees, and a root cause analysis database.

4. The method of claim 1, wherein assigning, by the one or more computer processors, based, at least in part, on the comparing, a probability to the generated event tree further comprises:
   determining, by the one or more computer processors, one or more of: at least one relationship of at least one event of the received one or more events with a second event of the received one or more events, a time of the received one or more events, and a match between the generated event tree and an event tree stored in the database; and
   determining, by the one or more computer processors, based on at least one of the at least one relationship, the time, and the match, the likelihood of the generated event tree occurring within the networked computing environment.

5. The method of claim 1, further comprising:
   responsive to determining the assigned probability is a high probability rating, updating, by the one or more computer processors, the incident ticket with the generated event tree, wherein the generated event tree indicates at least a possible solution to the one or more events.

6. A computer program product for generating event trees, the computer program product comprising:
   one or more computer-readable tangible storage media and program instructions stored on the one or more computer-readable tangible storage media, the program instructions comprising:
   program instructions to receive one or more events occurring within a networked computing environment;
   program instructions to generate an event tree including the received one or more events;
   program instructions to compare the generated event tree with a plurality of event trees stored in a database, wherein comparing the generated event tree with the plurality of event trees stored in a database includes program instructions to determine the generated event tree includes a top event, a middle event, and a root event;

program instructions to compare the top event, the middle event, and the root event of the generated event tree with the plurality of event trees stored in the database, the plurality of event trees each including at least a top event, a middle event, and a root event;

program instructions to assign based, at least in part, on the comparing, a probability to the generated event tree, wherein the probability indicates a likelihood of the generated event tree occurring within the networked computing environment and wherein if the top event, the middle event, and the root event of the generated event tree matches the top event, the middle event, and the root event of at least one of the plurality of event trees, the assigned probability is a highest probability; and program instructions to determine, based, at least in part, on the assigned probability, an incident ticket within the networked computing environment corresponding to the generated event tree, wherein the incident ticket contains information about at least one technical support action.

7. The computer program product of claim 6, wherein the received one or more events are received from one or more technology domains.

8. The computer program product of claim 6, wherein the plurality of event trees stored in the database include: vendor published event trees, technical support team created event trees, and a root cause analysis database.

9. The computer program product of claim 6, wherein the program instructions to compare the generated event tree with the plurality of event trees stored in a database further comprise:

program instructions to determine the generated event tree includes at least one of: a top event, a middle event, and a root event; and program instructions to compare the top event, the middle event, and the root event of the generated event tree with the plurality of event trees stored in the database, the plurality of event trees each including at least a top event, a middle event, and a root event.

10. The computer program product of claim 9, further comprising:

program instructions to determine whether the top event of the generated event tree matches the top event of at least one of the plurality of event trees; and responsive to determining whether the top event of the generated event tree matches the top event of at least one of the plurality of event trees, program instructions to assign a probability to the generated event tree.

11. The computer program product of claim 6, wherein the program instructions to assign based, at least in part, on the comparing, a probability to the generated event tree further comprise:

program instructions to determine one or more of: at least one relationship of at least one event of the received one or more events with a second event of the received one or more events, a time of the received one or more events, and a match between the generated event tree and an event tree stored in the database; and program instructions to determine, based on at least one of the at least one relationship, the time, and the match, the likelihood of the generated event tree occurring within the networked computing environment.

12. The computer program product of claim 6, further comprising:

responsive to determining the assigned probability is a high probability rating, program instructions to update the incident ticket with the generated event tree, wherein the generated event tree indicates at least a possible solution to the one or more events.

13. A computer system for generating event trees, the computer system comprising:

one or more computer processors;

one or more computer-readable tangible storage media; and program instructions stored on the one or more computer-readable tangible storage media for execution by at least one of the one or more computer processors, the program instructions comprising:

program instructions to receive one or more events occurring within a networked computing environment;

program instructions to generate an event tree including the received one or more events;

program instructions to compare the generated event tree with a plurality of event trees stored in a database, wherein comparing the generated event tree with the plurality of event trees stored in a database includes program instructions to determine the generated event tree includes a top event, a middle event, and a root event;

program instructions to compare the top event, the middle event, and the root event of the generated event tree with the plurality of event trees stored in the database, the plurality of event trees each including at least a top event, a middle event, and a root event;

program instructions to assign based, at least in part, on the comparing, a probability to the generated event tree, wherein the probability indicates a likelihood of the generated event tree occurring within the networked computing environment and wherein if the top event, the middle event, and the root event of the generated event tree matches the top event, the middle event, and the root event of at least one of the plurality of event trees, the assigned probability is a highest probability; and program instructions to determine, based, at least in part, on the assigned probability, an incident ticket within the networked computing environment corresponding to the generated event tree, wherein the incident ticket contains information about at least one technical support action.

14. The computer system of claim 13, wherein the plurality of event trees stored in the database include: vendor published event trees, technical support team created event trees, and a root cause analysis database.

15. The computer system of claim 13, wherein the program instructions to compare the generated event tree with the plurality of event trees stored in a database further comprise:

program instructions to determine the generated event tree includes at least one of: a top event, a middle event, and a root event; and program instructions to compare the top event, the middle event, and the root event of the generated event tree with the plurality of event trees stored in the database, the plurality of event trees each including at least a top event, a middle event, and a root event.

16. The computer system of claim 15, further comprising:

program instructions to determine whether the top event of the generated event tree matches the top event of at least one of the plurality of event trees; and responsive to determining whether the top event of the generated event tree matches the top event of at least one of the plurality of event trees, program instructions to assign a probability to the generated event tree.

17. The computer system of claim 13, wherein the program instructions to assign based, at least in part, on the comparing, a probability to the generated event tree further comprise:
  program instructions to determine one or more of: at least one relationship of at least one event of the received one or more events with a second event of the received one or more events, a time of the received one or more events, and a match between the generated event tree and an event tree stored in the database; and
  program instructions to determine, based on at least one of the at least one relationship, the time, and the match, the likelihood of the generated event tree occurring within the networked computing environment.

18. The computer system of claim 13, further comprising:
  responsive to determining the assigned probability is a high probability rating, program instructions to update the incident ticket with the generated event tree, wherein the generated event tree indicates at least a possible solution to the one or more events.

* * * * *